(12) United States Patent
Tang et al.

(10) Patent No.: US 12,184,843 B2
(45) Date of Patent: Dec. 31, 2024

(54) PARALLEL ENCODING OF VIDEO FRAMES WITHOUT FILTERING DEPENDENCY

(71) Applicant: NVIDIA Corporation, Santa Clara, CA (US)

(72) Inventors: Yongmao Tang, Shanghai (CN); Jianjun Chen, Shanghai (CN); Wei Feng, Shanghai (CN); Sangeun Han, Santa Clara, CA (US); Xi He, Shanghai (CN)

(73) Assignee: Nvidia Corporation, Santa Clara, CA (US)

( * ) Notice: Subject to any disclaimer, the term of this patent is extended or adjusted under 35 U.S.C. 154(b) by 252 days.

(21) Appl. No.: 17/451,974

(22) Filed: Oct. 22, 2021

(65) Prior Publication Data

US 2023/0071018 A1 Mar. 9, 2023

Related U.S. Application Data

(63) Continuation of application No. PCT/CN2021/116711, filed on Sep. 6, 2021.

(51) Int. Cl.
*H04N 19/117* (2014.01)
*H04N 19/105* (2014.01)
(Continued)

(52) U.S. Cl.
CPC ......... *H04N 19/117* (2014.11); *H04N 19/105* (2014.11); *H04N 19/167* (2014.11);
(Continued)

(58) Field of Classification Search
CPC .. H04N 19/117; H04N 19/436; H04N 19/105; H04N 19/167; H04N 19/175; H04N 19/196
See application file for complete search history.

(56) References Cited

U.S. PATENT DOCUMENTS

| 8,311,111 B2 | 11/2012 | Xu et al. |
| 9,432,668 B1 | 8/2016 | Bossen et al. |

(Continued)

FOREIGN PATENT DOCUMENTS

| CN | 102150425 A | 8/2011 |
| CN | 104012094 A | 8/2014 |

(Continued)

OTHER PUBLICATIONS

Chen, Y. et al., "An Overview of Coding Tools in AV1 Video Codec", 2018 Picture Coding Symposium (PCS), DOI: 10.1109/PCS.2018.8456249, Jun. 24-27, 2018, 5 pages.

(Continued)

*Primary Examiner* — Kathleen V Nguyen
(74) *Attorney, Agent, or Firm* — Lowenstein Sandler LLP

(57) ABSTRACT

Disclosed are techniques for compressing data of an image using multiple processing cores. The techniques include obtaining, using a first (second, etc.) processing core, a first (second, etc.) plurality of reconstructed blocks approximating source pixels of a first (second, etc.) portion of an image and filtering, using the first processing core, the first plurality of reconstructed blocks. The filtering includes enabling application of one or more filters to a first plurality of regions that include pixels of the first plurality of reconstructed blocks but not pixels of the second plurality of reconstructed blocks. The filtering further includes disabling application of the one or more filters to a second plurality of regions that include pixels of the first plurality of reconstructed blocks and pixels of the second plurality of reconstructed blocks.

20 Claims, 8 Drawing Sheets

(51) Int. Cl.
  *H04N 19/167* (2014.01)
  *H04N 19/174* (2014.01)
  *H04N 19/196* (2014.01)
  *H04N 19/436* (2014.01)

(52) U.S. Cl.
  CPC ......... *H04N 19/174* (2014.11); *H04N 19/196* (2014.11); *H04N 19/436* (2014.11)

(56) References Cited

U.S. PATENT DOCUMENTS

| | | | |
|---|---|---|---|
| 9,998,726 | B2 | 6/2018 | Rusanovskyy et al. |
| 10,070,128 | B2 | 9/2018 | Ugur et al. |
| 10,091,514 | B1 | 10/2018 | Bossen et al. |
| 10,621,731 | B1 | 4/2020 | Duenas et al. |
| 10,687,054 | B2 | 6/2020 | Mahdi et al. |
| 10,887,611 | B2 | 1/2021 | Seregin et al. |
| 10,999,594 | B2 | 5/2021 | Hsieh et al. |
| 11,017,566 | B1 | 5/2021 | Tourapis et al. |
| 11,057,636 | B2 | 7/2021 | Huang et al. |
| 11,070,813 | B2 | 7/2021 | Socek et al. |
| 11,172,195 | B2 | 11/2021 | Seregin |
| 11,197,009 | B2 | 12/2021 | Zhang et al. |
| 11,202,070 | B2 | 12/2021 | Zhang et al. |
| 11,218,694 | B2 | 1/2022 | Seregin et al. |
| 11,272,201 | B2 | 3/2022 | Seregin et al. |
| 11,317,111 | B2 | 4/2022 | Rusanovskyy et al. |
| 11,343,504 | B2 | 5/2022 | Zhao et al. |
| 11,368,684 | B2 | 6/2022 | Seregin et al. |
| 11,388,394 | B2 | 7/2022 | Seregin et al. |
| 11,496,746 | B2 | 11/2022 | Siddaramanna et al. |
| 11,563,933 | B2 | 1/2023 | Seregin et al. |
| 11,582,475 | B2 | 2/2023 | Rusanovskyy et al. |
| 11,638,025 | B2 | 4/2023 | Pourreza et al. |
| 11,638,062 | B2 | 4/2023 | Stockhammer et al. |
| 11,677,987 | B2 | 6/2023 | Said |
| 2010/0118945 | A1 | 5/2010 | Wada et al. |
| 2013/0016783 | A1 | 1/2013 | Kim et al. |
| 2013/0101035 | A1* | 4/2013 | Wang ................. H04N 19/174 375/E7.243 |
| 2013/0259142 | A1 | 10/2013 | Ikeda et al. |
| 2014/0198844 | A1 | 7/2014 | Hsu et al. |
| 2015/0229921 | A1 | 8/2015 | Chen et al. |
| 2016/0330445 | A1 | 11/2016 | Ugur et al. |
| 2017/0085886 | A1 | 3/2017 | Jacobson et al. |
| 2017/0201769 | A1* | 7/2017 | Chon ................. H04N 19/147 |
| 2017/0272758 | A1* | 9/2017 | Lin .................... H04N 19/176 |
| 2020/0021847 | A1 | 1/2020 | Kim et al. |
| 2020/0029096 | A1 | 1/2020 | Rusanovskyy |
| 2020/0099926 | A1 | 3/2020 | Tanner et al. |
| 2020/0104976 | A1 | 4/2020 | Mammou et al. |
| 2020/0105024 | A1 | 4/2020 | Mammou et al. |
| 2020/0111237 | A1 | 4/2020 | Tourapis et al. |
| 2020/0204829 | A1 | 6/2020 | Stepin et al. |
| 2020/0288122 | A1 | 9/2020 | Kim |
| 2020/0359022 | A1 | 11/2020 | Abe et al. |
| 2020/0382777 | A1 | 12/2020 | Zhang et al. |
| 2020/0382804 | A1 | 12/2020 | Zhang et al. |
| 2021/0006833 | A1 | 1/2021 | Tourapis et al. |
| 2021/0021809 | A1 | 1/2021 | Kim |
| 2021/0099701 | A1 | 4/2021 | Tourapis et al. |
| 2021/0211661 | A1 | 7/2021 | Toma et al. |
| 2021/0211703 | A1 | 7/2021 | Kim et al. |
| 2021/0211724 | A1 | 7/2021 | Kim et al. |
| 2021/0217203 | A1 | 7/2021 | Kim et al. |
| 2021/0321093 | A1 | 10/2021 | Sundaram et al. |
| 2021/0377868 | A1 | 12/2021 | Anand |
| 2021/0392334 | A1 | 12/2021 | Esenlik et al. |
| 2022/0021891 | A1 | 1/2022 | Chaudhari et al. |
| 2022/0256169 | A1* | 8/2022 | Siddaramanna ..... H04N 19/147 |
| 2022/0277164 | A1 | 9/2022 | Malayath |
| 2022/0279204 | A1 | 9/2022 | Malayath et al. |
| 2023/0063062 | A1 | 3/2023 | Srinivasan et al. |
| 2023/0071018 | A1 | 3/2023 | Tang et al. |

FOREIGN PATENT DOCUMENTS

| | | |
|---|---|---|
| CN | 108449603 A | 8/2018 |
| CN | 110035290 A | 7/2019 |
| CN | 111918058 A | 11/2020 |
| CN | 113301347 A | 8/2021 |
| JP | 2014127891 A | 7/2014 |
| WO | 2010030752 A2 | 3/2010 |
| WO | 2012030752 A2 | 3/2012 |
| WO | 2013067903 A1 | 5/2013 |
| WO | 2019163794 A1 | 8/2019 |

OTHER PUBLICATIONS

Han, J. et al., "A Technical Overview of AV1", arXiv:2008.06091v2 [eess.IV] Feb. 8, 2021, pp. 1-25.

Goebel et al., "Hardware Design of DC/CFL Intra-Prediction Decoder for AV1 Codec," 32nd Symposium of Integrated Circuits and Systems Design (SBCCI), Sao Paulo, Brazil, Aug. 26-30, 2019, pp. 1-6.

International Search Report and Written Opinion for International Application No. PCT/CN2021/116311, mailed May 31, 2022, 6 Pages.

International Search Report and Written Opinion for International Application No. PCT/CN2021/116312, mailed May 26, 2022, 9 Pages.

International Search Report and Written Opinion for International Application No. PCT/CN2021/116711, mailed Apr. 24, 2022, 7 Pages.

ITU-T; H.265 (Year: 2016).

ITU-T; H.266 (Year: 2020).

Non-Final Office Action for U.S. Appl. No. 17/451,972, mailed Dec. 28, 2023, 51 Pages.

* cited by examiner

PARALLEL ENCODING OF VIDEO FRAMES WITHOUT FILTERING DEPENDENCY

RELATED APPLICATIONS

This application claims the benefit of priority under 35 U.S.C. 365 to the international application PCT/CN2021/116711, filed Sep. 6, 2021 with the China National Intellectual Property Administration, which is hereby incorporated in its entirety.

TECHNICAL FIELD

At least one embodiment pertains to computational technologies used to perform and facilitate efficient compression of video files. For example, at least one embodiment pertains to operations utilized by video codecs for efficient encoding of high-definition video files using modern video encoding standards that, while offering a large variety of tools and options that enhance video quality, come at the cost of increased computational complexity.

BACKGROUND

A video file in a raw (source) pixel format can occupy a very large memory space and can require a large network bandwidth and/or time for its network transmission. This usually makes raw pixel format impractical for data storage and/or livestreaming. For example, a typical high-definition video displays about 30 frames per second, which are typically rather similar to each other. A lot of information in such frames is necessarily redundant, allowing efficient compression. On one hand, relatively minor changes occur between subsequent frames (temporal redundancy). On the other hand, various regions in a given frame are often similar to each other (spatial redundancy), e.g., an image of the sky can extend over a large portion of a frame. As a result, in lieu of transmitting the actual pixel information (luminance and chromaticity) of each pixel, a codec can identify a reference block that is similar to the block being encoded ("predicted") and provide to a decoder a suitable and compact mathematical representation of the difference ("delta" or "residual") between the actual source block and the predicted block. The reference block can be a block of a different (e.g., previous, or even subsequent) frame, a block of the same frame, or even a synthetic block generated according to some pre-determined scheme (mode) based on a small number of reference pixels. Subsequently, instead of storing or livestreaming the actual frame of pixels, the codec can output a bitstream of encoded data, which largely contains instructions to the decoder about how to generate an approximation of the frame whose visual appearance is indistinguishable from or very similar to the source frame.

DETAILED DESCRIPTION

Figure 1A:
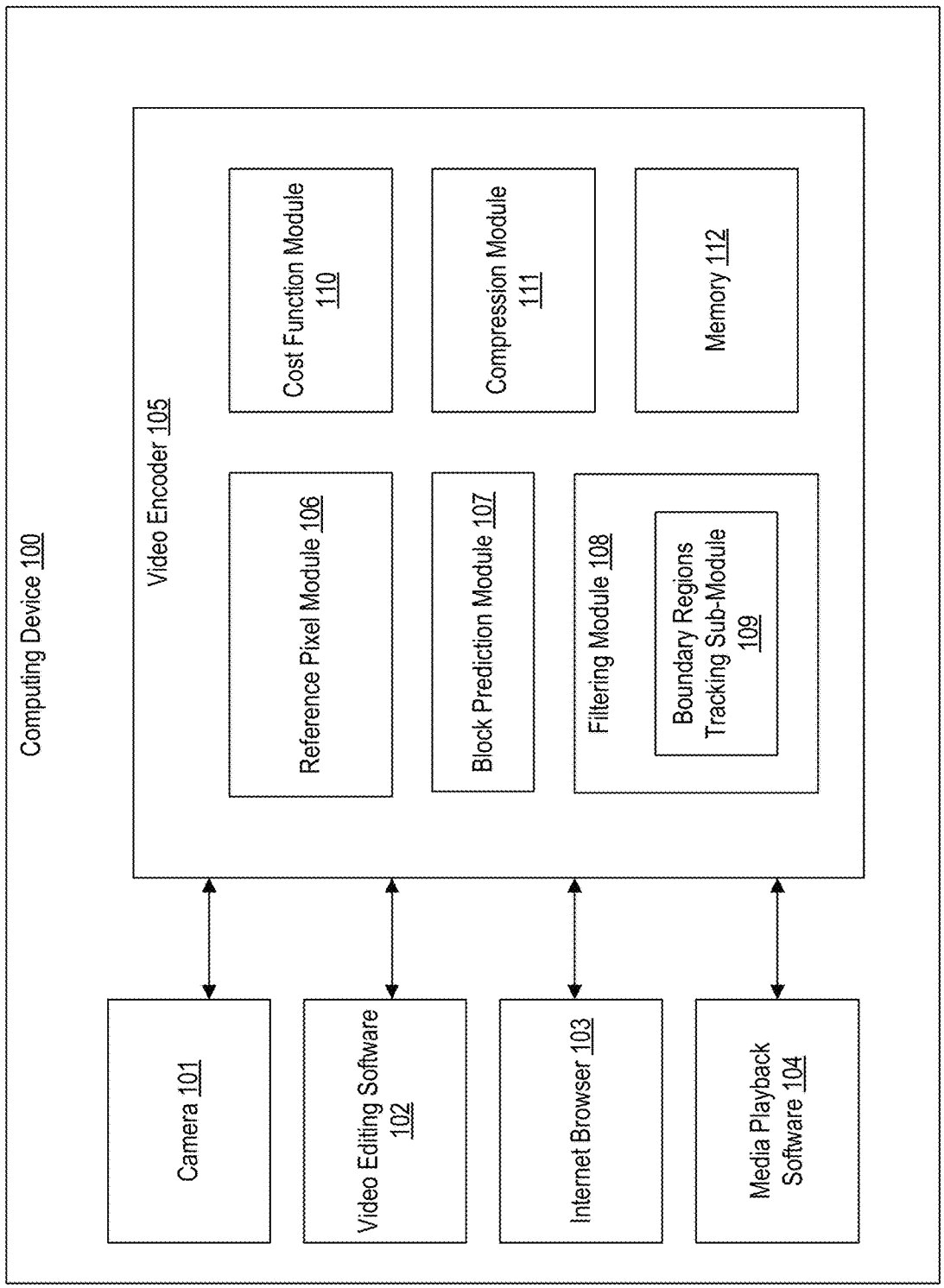
FIG. 1A is a schematic block diagram of an example computing device that may implement the disclosed techniques for efficient encoding operations, in accordance with at least some embodiments.

Video codecs allow digital video files to be compressed in order to reduce the amount of storage space and bandwidth required to store and transmit the files. The compressed video file may appear very similar to or indistinguishable from the source video file when the former is uncompressed and displayed to a viewer. In order to compress the digital video file, the codec divides each frame of the video into a series of blocks. For each block, the codec determines the best size and the best mode to use for compression. The codec may determine to use an intra-prediction mode or an inter-prediction mode. Then, for each block, after making a size selection and a mode selection, the codec may compare pixels of the predicted block to the respective block of the source pixels, calculate the difference (residual), and encode the prediction size, prediction mode, and the residual pixel values in an output bitstream. A single frame may be divided into blocks of multiple sizes, and each block may have its unique prediction mode. A subsequent frame may be divided into blocks of different sizes, and each block may have a prediction mode that is different from the prediction modes of the blocks of the previous frame. The codec processes each frame individually and tries to minimize the cost of encoding the frame.

Each pixel value of the frame may include multiple components, such as a luma component, indicating brightness or intensity of the pixel, and a chroma component, indicating one or more colors of the pixel (e.g., Red, Green, Blue chromaticity values, or any other suitable color values).

An intra-predicted block may use reference pixel values from neighboring blocks to approximate the pixel values of the source block. For example, the pixel values of an intra-predicted block may be based on pixel values from the bottom boundary of the block above it, pixel values from the right boundary of the block to the left of it, a pixel value from the bottom-right corner of the block to the top-left of it, or a combination of these pixel values. Intra-prediction modes are effective in regions of a video frame with similar colors across many blocks (e.g., a blue sky).

An inter-predicted block may use pixel values from a previous frame or a subsequent frame (herein referred to as a reference frame) to approximate the pixel values of the source block. Inter-predictions are particularly effective for moving objects in the video. As the object moves, the object in the current frame may appear similar or identical to the object in the reference frame, even though the object may be in a new position. The codec can use the same pixel values from the object in the reference frame to approximate the pixel values of the object in the current frame. Because the codec uses the same pixel values from the reference frame and does not need to create a new set of pixel values for the inter-predicted block, inter-predicted blocks often result in a higher compression rate than intra-predicted blocks.

There are various video codec standards that have been defined, such as H.264 (Advanced Video Coding or AVC), H.265 (High Efficiency Video Coding or HEVC), H.266 (Versatile Video Coding or VVC), VP9, and AV1 (AOMedia Video 1). Each standard defines a set of recognized inter-prediction modes and a set of recognized intra-prediction modes. Each standard also defines a set of block sizes that are acceptable. For example, AV1 allows for 58 intra-frame prediction modes, multiple inter-frame prediction modes, and a variety of block sizes, including square blocks of the following size (in pixels): 8×8, 16×16, 32×32, 64×64, 128×128, and rectangular blocks 64×32, 32×64, 32×16, 16×32, 16×8, 8×16.

A standard video codec starts in the top-left corner of a frame, evaluates the cost of all possible combinations of block sizes and prediction modes (both intra-prediction modes and inter-prediction modes), makes a selection based on the calculated costs, and proceeds to the next block (e.g., the block to the right of the top-left block). Because the intra-prediction modes use pixel values from neighboring blocks, each block needs to be processed sequentially, in order to ensure that the neighboring blocks have already been processed and have reference pixels available for processing of the current block.

Multiple processing cores (physical or virtual cores) may be used to speed up the processing of blocks. Each core may be processing one or more tiles of the video frame in parallel to other cores processing one or more different tiles of the same frame. For example, core 1 may be processing a first plurality of tiles that include blocks of the top half of a frame, whereas core 2 may be processing a second plurality of tiles that include blocks of the bottom half of the frame. Each core obtains predicted blocks (e.g., using inter-prediction modes or intra-prediction modes) within the respective plurality of tiles and computes a residual block representing a difference between the source pixels of the respective block and pixels of the predicted block. The residual block is then processed using a suitable discrete transform (e.g., a discrete Fourier transform, a discrete cosine transform, etc.) and a quantization is performed to eliminate a short wavelength (large frequency) end of the transformed representation that is poorly discernable by a human eye. The remaining (quantized) coefficients of the transform are encoded in a bitstream that is provided to a receiving device (e.g., a decoder) over a livestream or via a memory storage.

Additionally, on the encoder size, the decoding process is being performed to determine parameters of filters to be applied to the decoded blocks in order to improve the imaging quality of the video frame. In particular, the inverse residual block is obtained by reversing the discrete transform using the quantized coefficients. The inverse residual block is then added to the predicted block to obtain a reconstructed block. The obtained reconstructed video frame (made of reconstructed blocks), however, may include a variety of artifacts of the performed compression procedure. For example, the reconstructed video frame may have discontinuities of intensity/color along the boundaries of various blocks, the quantized representation of the discrete transforms may result in a blurring of sharp boundaries of objects depicted in the video frame (ringing artifacts), some blocks may have acquired noise, and so on.

To reduce compression artifacts, each of the processing cores may apply one or more filters to the reconstructed blocks. Some of the filters may be applied across boundaries of different blocks, e.g., blocks reconstructed using different modes and/or reference pixels. For example, an 8×8 pixel constrained directional enhancement filter (CDEF) or a 7×7 pixel Winer filter may be applied to a region that straddles at least one block boundary, with some pixels belonging to a first block and some pixels belonging to a second block (a third block and, possibly, a fourth block, if the filter is applied near an intersection of three or four block boundaries). Herein, a region that includes pixels of multiple blocks is referred to as a boundary region. Boundary regions may be of two types. Boundary regions of a first type include pixels of blocks predicted and reconstructed by a single processing core. Boundary regions of a second type include pixels of blocks predicted and reconstructed by multiple processing cores. For example, a filter may be applied to an 8×8 pixel boundary region consisting of a top 8×4 pixel portion processed by a first core and a bottom 8×4 pixel portion processed by a second core. Filtering of the second type boundary regions introduces interdependencies into operations of different cores. More specifically, if the filtering of a boundary region is to be performed by a first core, the first core needs to have access to the pixels reconstructed by a second core (and vice versa). This may require cross-coordination of processing and memory operations performed by separate cores. Additionally, pixels of the boundary regions of the second type cannot be filtered until all pixels of the region are predicted and reconstructed by a respective core. These and other complications of multi-core processing result in a performance drop of up to 20% (or more) in terms of an increased time of encoding.

Aspects and embodiments of the present disclosure address these and other technological challenges of real-time video encoding in modern advanced codecs by reducing filtering dependencies encountered in the multi-core encoding process. In some embodiments, dependencies are removed by tracking boundary regions and preventing application of filters to the boundary regions that include pixels processed (e.g., predicted and reconstructed) by different cores. As a result, filtering is suppressed along a boundary of tiles and blocks assigned to different cores and enabled along boundaries of tiles and blocks assigned to the same core(s).

Advantages of the disclosed embodiments over the existing technology include a significant acceleration of the encoding process. Removing filtering dependencies obviates the need for coordinated (e.g., synchronized) processing by different cores and improves livestreaming compatibility by increasing bitrate of encoding at a cost of an insignificant drop in the quality of compressed video frames.

System Architecture

FIG. 1A is a schematic block diagram of an example computing device 100 that may implement the disclosed techniques for efficient encoding operations, in accordance with at least some embodiments. The computing device 100 may include one or more devices, modules, and/or applications that interact with a video encoder 105, such as a camera 101, a video editing software 102, an internet browser 103, and/or a media playback software 104, and the like. The video encoder 105 may perform at least some aspects of the present disclosure. The video encoder 105 may include a reference pixel module 106, a block prediction module 107, a filtering module 108, a cost function module 110, a compression module 111, and a memory 112. The filtering module 108 may have a boundary region tracking submodule 109 for identification of filtering regions that straddle boundaries of blocks processed by different cores.

The reference pixel module 106 may store the predicted block pixel values in the memory 112 as such values are created. Memory 112 may also store the source pixel value of the video frames. The reference pixel module 106 may also retrieve from the memory 112 the reference pixel values that are used for approximating block(s) currently being processed by the video encoder 105. For example, the reference pixel module 106 may retrieve from the memory 112 a subset of the computed pixel values of the blocks to the top, to the left, and to the top-left of the block(s) currently being processed for use in calculating the cost of one or more intra-prediction modes. The reference pixel module 106 may also retrieve from the memory 112 computed pixel values of a block from an already processed previous frame or a subsequent frame that corresponds to the block(s) currently being processed, for use in calculating the cost of one or more inter-prediction modes. Since inter-prediction modes are often used for moving objects, the reference pixel module 106 may retrieve pixel values, from a previously processed frame, e.g., from a block that neighbors the current block. For example, the reference pixel module 106 may retrieve from the memory 112 computed pixel values from a previously processed frame of a block that is to the right of the block currently being processed.

The block prediction module 107 may use the reference pixel values from the reference pixel module 106 when calculating predictions for each block. The block prediction module 107 may perform intra-frame predictions and inter-frame predictions. In some embodiments, the block prediction module 107 may perform sequential processing of blocks and tiles (e.g., in current and reference frames) assigned to a particular processing core independently of blocks assigned to other processing cores. In some embodiments, as described in more detail below, the tiles assigned to a particular core may be processed using a combination of sequential and parallel processing. For example, the block prediction module 107 may perform an initial (fast) sequential prediction of the tiles, a subsequent (more detailed) parallel prediction of the same tiles, and a final sequential reconstruction of the tiles. Multiple variations of the processing of tiles/blocks in each core may be performed. For example, during the initial sequential processing (fast prediction), the block prediction module 107 may calculate intra-frame predictions but not inter-frame predictions, whereas during the parallel processing (detailed prediction), the block prediction module 107 may use both the intra-frame predictions and the inter-frame predictions.

When creating an intra-frame predicted block, the block prediction module 107 may use reference pixel values from the reference pixel module 106, as described above. The reference pixel values may be from one or more blocks that neighbor the current block. Based on the intra-prediction mode that is used, the intra-frame predicted block may have different pixel values. For example, the intra-prediction mode may be a vertical mode, such that the predicted block has pixel values obtained from a top neighboring block. Alternatively, the intra-prediction mode may be a horizontal mode, such that the predicted block has pixel values obtained from a left neighboring block. As another example, the intra-prediction mode may use a different direction (e.g., at some oblique angle to the horizontal direction), such that the predicted block has a combination of pixel values from multiple neighboring blocks.

When creating an inter-frame predicted block, the block prediction module 107 may use reference pixel values from the reference pixel module 106, as described above. The reference pixel values may be from the same block in a previously processed frame or from a block that neighbors the current block in a previously processed frame. In some instances, the reference pixel value may be from a block that is displaced relative to (but partially overlaps with) the current block. As a result, similarly to the intra-prediction blocks, the inter-frame predicted block may have different pixel values depending on the specific inter-prediction mode that is used.

The block prediction module 107 may generate multiple predictions for a given block. Each prediction may be based on a unique combination of a block size and a prediction mode for the current block. If a combination of sequential and parallel processing is being used, the number of predictions generated for each block may vary between the initial sequential processing, the parallel processing, and the final sequential processing. For example, during the initial sequential processing, each prediction may have the same block size but may have a different intra-prediction mode, whereas during the parallel processing, at least some or even most predictions may have a different size and a different prediction mode (either an intra-prediction or an inter-prediction mode). Each prediction is passed to the cost function module 110 to calculate a corresponding cost.

The cost function module 110 may receive one or more predictions for a block from the block prediction module 107. For each prediction, the pixel values of the predicted block are compared to the pixels values of a corresponding source block of the original video frame being encoded. Various cost functions may be used, including a sum of absolute transformed differences (SATD), a sum of squared differences (SSD), or any other suitable cost function. In some instances, the cost function module 110 may calculate costs using one component of the pixel values during the initial sequential processing and multiple components during the parallel processing. For example, the cost function module 110 may calculate the costs of the intra-frame predictions of the initial sequential processing using the luma component of each pixel value. Then, during the parallel processing, the cost function module 110 may calculate the costs of the block predictions using both the luma component and the chroma component of each pixel value. In another embodiment, the cost function module 110 may calculate the costs of the predictions of both the initial sequential processing and the parallel processing using the luma component of each pixel value and ignoring the chroma component of each pixel value. In another embodiment, the cost function module 110 may calculate the costs of the predictions of both the initial sequential processing and the parallel processing using both the luma component and the chroma component of each pixel value. In some embodiments, the cost function module 110 may weight errors in the representation of the luma component and the chroma component differently, e.g., using empirically selected weights. Furthermore, errors in different colors of the chroma component may be weighed differently from each other, e.g., an error in the red color may be weighed more than an error in the blue color (or vice versa).

If the predicted block is substantially different from the corresponding source block, the cost may be high. If the predicted block is substantially similar to the corresponding source block, the cost may be low. The cost function module 110 may select a prediction for the given block based on a comparison of the costs of each of the predictions of the block. In one embodiment, the cost function module 110 may select the prediction with the lowest cost. The selected prediction for a given block may include a block size and a prediction mode.

After a prediction has been selected for a given block, the cost function module 110 may communicate the selection to the block prediction module 107. The block prediction module 107 may then communicate the predicted block that corresponds to the selected prediction to the reference pixel module 106 to be stored in the memory 112 to be used as a reference block for a future block and/or frame. The block prediction module 107 may also communicate the predicted block that corresponds to the selected prediction to the compression module 111.

The compression module 111 may compute the residual, which may be a block of residual pixel values that represent a difference between the pixel values of the predicted block and the pixel values of a corresponding source block. The compression module 111 may then encode the residual pixel values, the prediction block size, and the prediction block mode in an output bitstream, according to the specifications defined in a video codec standard, such as AV1 or any other suitable standard. In some embodiments, the compression module 111 may transform and compress the residual pixel values, according to the specifications defined in a video codec standard, prior to encoding the values in the output bitstream. The compression performed by the compression module 111 may include application of discrete transforms to the predicted blocks, quantization of the obtained transforms, application of the discrete transforms to obtain reconstructed residuals, and addition of the reconstructed residuals to the predicted blocks to obtain reconstructed blocks.

The reconstructed blocks of the video frame(s) may not yet be what is intended to be displayed (on the decoder side) to a viewer. The reconstructed blocks may additionally be processed by the filtering module 108 to determine a parameter of filters to be applied for enhancement of the visual quality of the reconstructed blocks. The filtering module 108 may select from a number of filters recognized by the codec standard being used and may further determine various filter parameters to enhance the visual quality of the reconstructed blocks, including removal of boundary and other artifacts created during block prediction and reconstruction. In some embodiments, available filters may include a deblocking filter (loop filter) that removes visible block boundaries between neighboring blocks. For example, the deblocking filter may identify the value of discontinuity of luma and/or chroma values across the boundary and spread this value over a number of pixels. The filtering module 108 may determine the extent of the spread as one of the parameters to be included in the bitstream and provided to a decoder on the receiving side. Additionally, the filtering module 108 may apply a constrained directional enhancement filter (CDEF) to remove ringing artifacts near depictions of sharp edges of various objects. More specifically, because the quantization transform irreversibly reduces or eliminates some short-wavelength harmonics (which are important for imaging of sharp edges), CDEF may compensate for the loss of such harmonics. CDEF may identify the most likely directions of edges, e.g., by identifying lines of a constant intensity and lines of the largest intensity gradients. In some embodiments, identification of such lines may be performed by identifying and minimizing SSD for directions that best match directional patterns of the block. After identifying the direction of the edges depicted in the block, CDEF may sharpen the depictions of the edges in the block by choosing the filter strength along the determined direction and across this direction (or at 45-degree angles to this direction). The filtering module 108 may also apply a loop restoration (LR) filter to the reconstructed blocks. LR filter reduces blurring and noise using a number of available filters, such as a self-guided filter, a Wiener filter, or a combination of the self-guided filter and the Wiener filter. The identified filter parameters (for deblocking, CDEF, LR filters, or other suitable filters, or any combination thereof) are then included indo the codec output, which may be stored in memory 112 and/or livestreamed over the Internet or any other suitable network, including a local area network, a wide area network, a personal area network, a public network, a private network, and the like.

Figure 1B:
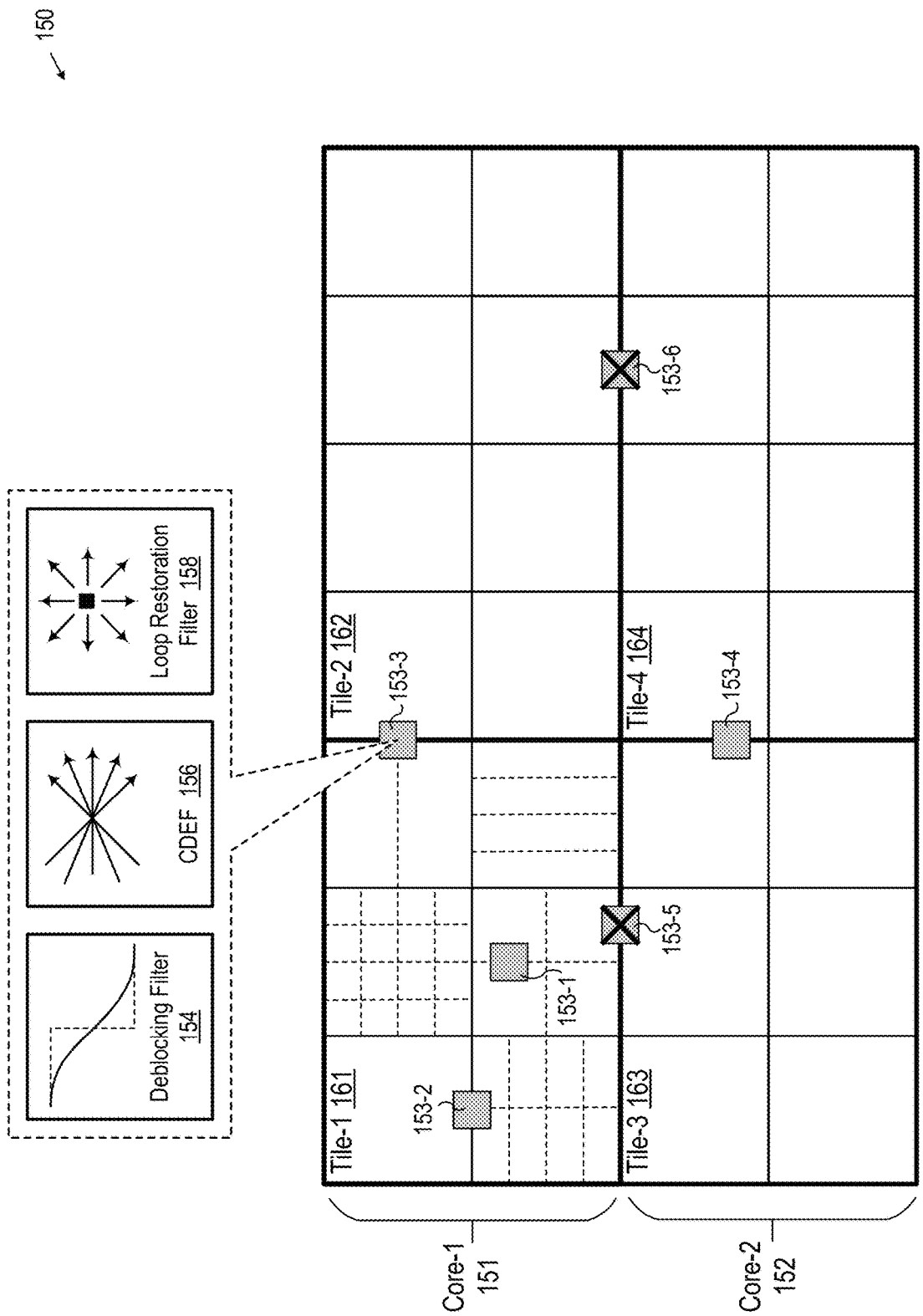
FIG. 1B is a schematic diagram depicting filtering operations of a codec system used for efficient encoding operations, in accordance with at least some embodiments.

FIG. 1B is a schematic diagram depicting filtering operations 150 of a codec system used for efficient encoding operations, in accordance with at least some embodiments. Filtering operations 150 may be performed by the filtering module 108 of FIG. 1A and by boundary regions tracking sub-module 109. Shown is a portion of a video frame that includes multiple tiles, including tiles 1-4, whose boundaries are indicated with thick solid lines. Multiple processing cores may be processing (predicting, reconstructing, and filtering) various tiles of the video frame. For example, as depicted, core-1 151 may be processing tile-1 161 and tile-2 162 while core-2 152 may be processing tile-3 163 and tile-4 164. Each core may also be processing any number of additional tiles, not shown in FIG. 1B for conciseness. Any number of additional processing cores may be processing other tiles of the video frame, not shown in FIG. 1B. A core, as used herein, may be a physical core of a processing device (herein also referred to as a processor) or a virtual core supported by a virtualized processing environment executed on a processing device. The processing device may include central processing units (CPUs), graphics processing units (GPUs), field programmable gate arrays (FPGAs), application-specific integrated circuits (ASICs), or any other suitable processing unit or a combination thereof. In some embodiments, the processing devices can be implemented as one or more circuits. In some implementations, various circuits may be performing various functions of the codec. For example, a first circuit may be performing initial (e.g., sequential) block size and mode selection, a second circuit may be performing a subsequent parallel block size and mode selection, a third circuit may be performing block reconstruction, a fourth circuit may be performing discrete transformations and quantization, a fifth circuit may be performing filtering, and so on. Each of the aforementioned circuits may support multiple processing cores for processing tiles assigned to the respective cores.

Each tile may include any number of superblocks (coding tree blocks), e.g., 64×64 pixel superblocks, 128×128 pixel superblocks, etc., whose boundaries are indicated in FIG. 1B with thin solid lines (unless a block boundary is also a boundary of a tile). For example, tile-1 161 and tile-3 163 have six superblocks each whereas tile-2 162 and tile-4 164 have eight superblocks each. A tile may have any number of superblocks. Each superblock may be segmented into any number of smaller blocks (coding blocks, prediction blocks) for intra-frame or inter-frame predictions. Prediction blocks of tile-1 161 are shown in FIG. 1B with the boundaries indicated with dashed lines (unless a prediction block boundary is also a boundary of a superblock or a tile). For example, the top-left superblock of tile-1 161 is not subdivided into smaller blocks and is predicted as a full 64×64 pixel block; the top-middle superblock of tile-1 161 is subdivided into sixteen 16×16 pixel blocks; the top-right superblock of tile-1 161 is subdivided into two 64×32 pixel blocks; the bottom-left superblock of tile-1 161 is subdivided into eight 32×16 pixel blocks; the bottom-middle superblock of tile-1 161 is subdivided into four 32×32 pixel blocks; and the bottom-right superblock of tile-1 161 is subdivided into four 16×64 pixel blocks. Discrete transforms (not depicted in FIG. 1B) can be applied to predicted blocks; the dimensions of the discrete transforms may, in general, be different from the dimensions of the predicted blocks.

Various filters may be applied to predicted and reconstructed (using discrete transforms, quantization transforms, and inverse discrete transforms, as described above) blocks. Dimensions of the applied filters may be different from the dimensions of the predicted blocks and the applied discrete transforms. In some embodiments, the dimensions of the filters may be set in the codec specification, e.g., the dimension of the Wiener LR filter may be 7×7 pixels. In some instances, filters (e.g., CDEF and/or LR filters) may be applied to pixels that are entirely within a particular predicted block. Since such filters operate on pixels processed (predicted and reconstructed) by a single core, such filters may be enabled. In some instances, filters (depicted with shaded squares) may be applied across boundaries of predicted blocks, boundaries of superblocks, boundaries of tiles processed by the same core, and boundaries of tiles processed by multiple cores. For example, filter 153-1 is applied to pixels of two predicted blocks within a single superblock, filter 153-2 is applied to pixels of two superblocks, and filters 153-3 and 153-4 are applied to pixels of different tiles processed by the same core (e.g., core-1 151 and core-2 152, respectively). Although filters 153-1 . . . 153-4 are depicted with same-sized squares, various filters may have different sizes. As depicted schematically with the callout portion in FIG. 1B, filter 153-3 (or any other filter) may include one or more of a deblocking filter 154 to smoothen block boundary artifacts, a CDEF 156 to remove ringing artifacts associated with sharp edges of objects, and/or an LR filter 158 to reduce blurring and noise. Depending on a specific codec standard, some of the filters may not be applied; likewise, other suitable filters (not listed in FIG. 1B) may be applied.

Under the conventional encoding approach, one or more of the deblocking filter 154, CDEF 156, and/or LR filter 158, may be applied to pixels processed by different cores, e.g., filter 153-5 is applied to a combination of pixels of tile-1 161 and tile-3 163 and filter 153-6 is applied to a combination of pixels of tile-2 162 and tile-4 164. In some embodiments of the present disclosure, filters that straddle boundaries of tiles processed by different cores may be disabled (as depicted schematically with crosses over filters 153-5 and 153-6), to remove inter-core filtering dependencies. More specifically, the boundary region tracking sub-module 109 may be tracking coordinates of the pixels belonging to a region to which one of the filters is to be applied and may disable the respective filter(s) if the corresponding regions contain pixels processed by different cores. In particular, the boundary region tracking sub-module 109 may be aware of the number of processing cores that are used to process a video frame and a distribution of various tiles/superblocks among different cores. When a filter of a size $(l_1+1) \times (l_2+1)$ is being applied to a region $[x, x+l_1; y, y+l_2]$, which corresponds to a rectangle having a top-left corner at a pixel x,y and a bottom-right corner at a pixel $x+l_1, y+l_2$, the boundary region tracking sub-module 109 may determine if there are any pixels in the rectangle (or any other suitable region) that belong to tiles processed by different cores. If all pixels in the rectangle are processed by the same core, the filtering module 108 may apply one or more filters in the usual manner. If at least one pixel in the rectangle (or any other suitable region) is processed by a core different than the core that is processing other pixels, filtering module 108 may disable the corresponding filter(s). For example, in an AV1 encoder, the filtering module 108 may disable the deblocking filter by implementing the following configuration and setting the loop filter level to zero:

seg_feature_active_idx(segment, 1)=1 FeatureData[segment][1]=−63
seg_feature_active_idx(segment, 2)=1 FeatureData[segment][2]=−63
seg_feature_active_idx(segment, 3)=1 FeatureData[segment][3]=−63
seg_feature_active_idx(segment, 4)=1 FeatureData[segment][4]=−63

Similarly, the filtering module 108 may set the parameter idx to −1 in the parameters of CDEF:

cdef_block(r,c,idx), for a specific block, which straddles the tile boundary, and is identified by a row index r and a column index c. Likewise, the filtering module 108 may disable the LR filter by setting lr_type=RESTORE_NONE.

Similar commands and operations may be used with other video encoders although the specific syntax of the operations may be different for different encoders.

Figure 2A:
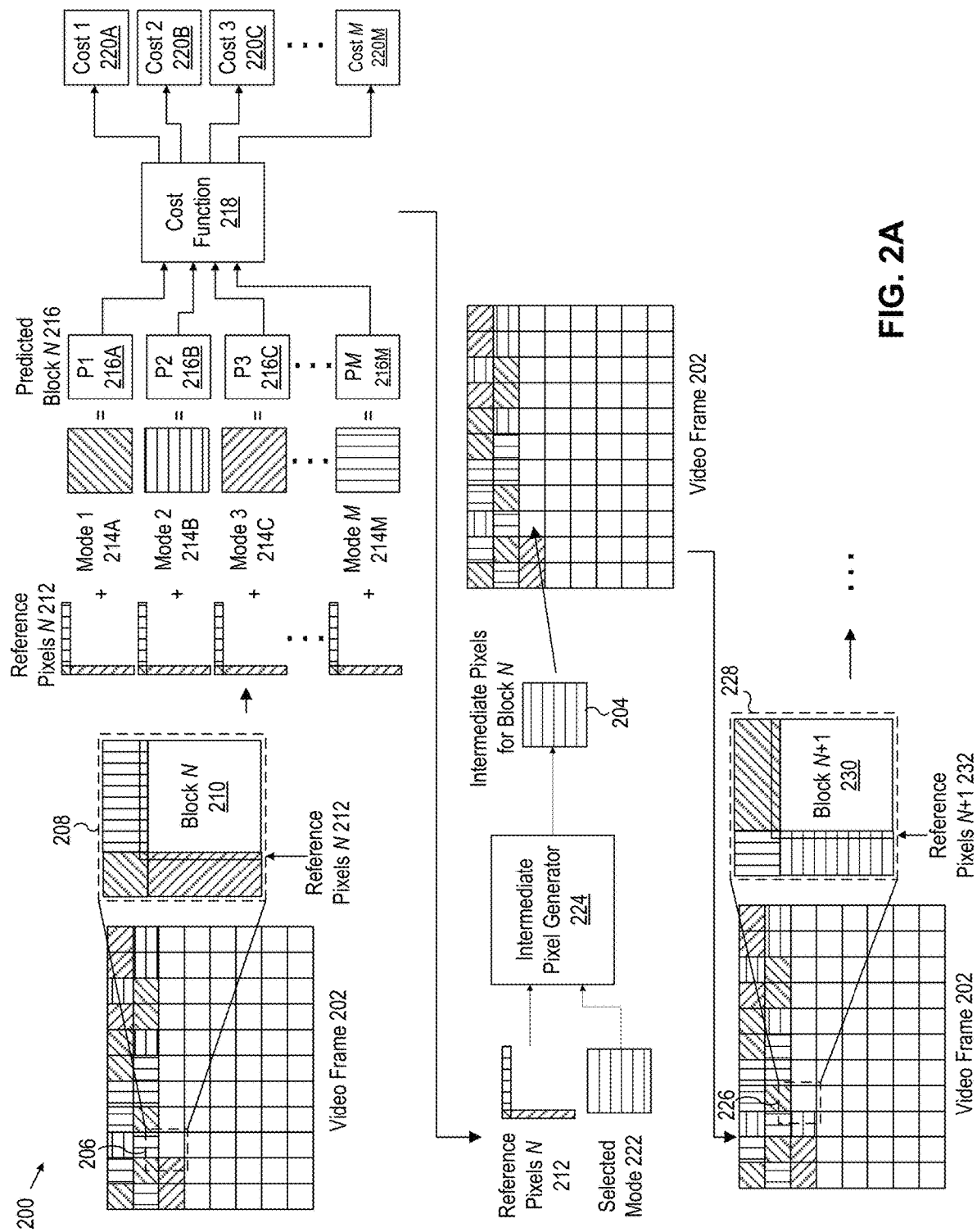
FIG. 2A is a schematic diagram depicting operations of a sequential processing of a codec system used for efficient encoding operations, in accordance with at least some embodiments.
Figure 2B:
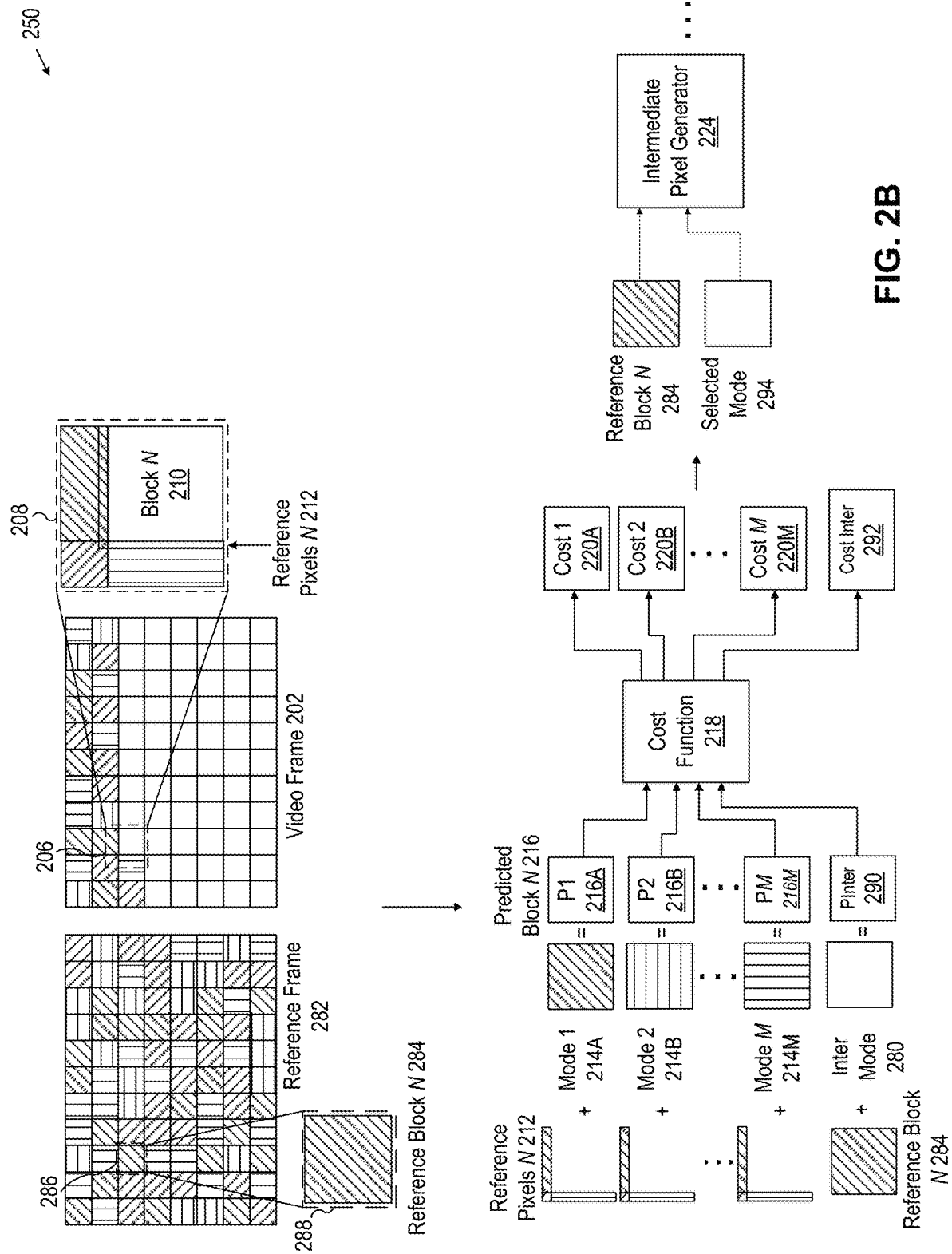
FIG. 2B is a schematic diagram depicting operations of another possible sequential processing of a codec system used for efficient encoding operations, in accordance with at least some embodiments.

In some embodiments, as described in more detail in relation to FIG. 2A and FIG. 2B, prior to filtering, each processing core may perform a combination of fast initial sequential prediction of blocks of a video frame, followed by a more detailed sequential processing of the same video frame.

FIG. 2A is a schematic diagram depicting operations of a sequential processing 200 of a codec system used for efficient encoding operations, in accordance with at least some embodiments. In some embodiments, the codec system may be the video encoder 105 of FIG. 1. The sequential processing 200 may be performed separately by each processing core and applied to a portion of the video frame assigned to the respective core. The sequential processing 200 may be used to generate intermediate pixels 204 for use in a subsequent parallel processing, as described above. The video frame 202 may be partitioned into blocks of a first size (e.g., 16×16 pixel blocks or any other suitable blocks). A first target region indicator 206 (depicted with a dashed box and a first enlarged target region 208) shows a current block 210 (block N) being processed and parts of the blocks that neighbor the current block 210. The blocks above and to the left of the current block 210 in the video frame 202 may have already been sequentially processed and a corresponding block of intermediate pixels may have been generated, as shown by the line-shaded blocks in the video frame 202. Each block of the video frame 202 corresponds to (and approximates) a similarly-located block of source pixels in the original video frame.

During the processing of the current block 210, a first set of reference pixels 212 may be selected from the generated intermediate pixels of the blocks neighboring the current block 210. Specifically, the first set of reference pixels 212 may be selected from the generated intermediate pixel blocks to the left, to the top, and to the top-left of the current block 210 (or from any other set of blocks, as may be specified by the codec standard). The set of reference pixels 212 may be combined with each mode 214A-M (Mode 1, Mode 2, . . . , Mode M) of a plurality of modes to create predicted blocks 216A-M (P1, P2, . . . , PM). Each of the predicted blocks 216A-M may then be processed using a cost function 218 to determine a cost 220A-M (Cost 1, Cost 2, . . . , Cost M) for each of the predicted blocks 216A-M. The cost function 218 may compare the predicted block to the corresponding block of source pixels from the video frame 202. A selected mode 222 may then be determined for the current block 210 based on a comparison of the costs 220A-M. An intermediate pixel generator 224 may generate an intermediate pixel block 204 for the current block 210. The intermediate pixel block 204 may be added to the video frame 202 at the location of the current block 210.

The sequential processing may continue with the next block 230 (e.g., the block to the right of the current block 210), as shown by a second target region indicator 226 and a second enlarged target region 228. During the processing of the next block 230, a second set of reference pixels 232 may be selected from the generated intermediate pixels of the blocks neighboring the next block 230. For example, a part of the intermediate pixel block 204, created during the processing of the current block 210, may be used as part of the second set of reference pixels 232. An intermediate pixel block may be generated for the next block 230 in a manner similar to that described above. This process may continue until each block of the first size in the video frame 202 has a corresponding intermediate pixel block.

FIG. 2B is a schematic diagram depicting operations of another possible sequential processing 250 of a codec system used for efficient encoding operations, in accordance with at least some embodiments. In some embodiments, the codec system may be the video encoder 105. Like sequential processing 200, the sequential processing 250 may be performed separately by each processing core and applied to a portion of the video frame assigned to the respective core. The sequential processing 250 may be used to generate intermediate pixels for use in a subsequent parallel processing in a manner similar to that of the sequential processing 200. As depicted, the sequential processing 250 may also use a reference frame 282, a reference block N 284, and an inter mode 280. The video frame 202 may be partitioned into blocks of a first size (e.g., 16×16 pixels). A first target region indicator 206 shows a current block 210 (block N) being processed and parts of the blocks that neighbor the current block 210. Next to the video frame 202 is a first enlarged target region 208. The blocks above and to the left of the current block 210 in the video frame 202 may have already been sequentially processed and a corresponding block of intermediate pixels may have been generated, as shown by the line-shaded blocks in the video frame 202.

During the processing of the current block in the sequential processing 250, a first set of reference pixels 212 may be selected from the generated intermediate pixels of the blocks neighboring the current block 210. Specifically, the first set of reference pixels 212 may be selected from the generated intermediate pixel blocks to the left, to the top, and to the top-left of the current block 210. Additionally, a reference block 284 (reference block N) may be selected from the generated intermediate pixels of the reference frame 282. A third target region indicator 286 shows the reference block 284 in the reference frame 282. Under the reference frame 282 is a third enlarged target region 288, showing the reference block 284. The set of reference pixels 212 may be combined with each mode 214A-M of a plurality of modes to create predicted blocks 216A-M. Reference block 284 may also be combined with inter mode 280 to create predicted block 290. Each of the predicted blocks 216A-M and predicted block 290 may then be processed using a cost function 218 to determine a cost 220A-M and 292 for each of the predicted blocks 216A-M and predicted block 290, respectively. The cost function 218 may compare the predicted block to the corresponding block of source pixels from the video frame 202. A selected mode 294 may then be determined for the current block 210 based on a comparison of the costs 220A-M and 292. An intermediate pixel block may be generated by the intermediate pixel generator 224 for the current block 210 using the selected mode 294 and the reference block 284.

In another embodiment, the initial sequential processing may divide the video frame into blocks of a first size and select, as intermediate pixels for each block, a corresponding block of source pixels from the video frame.

After each block of the video frame has a corresponding intermediate pixel block (e.g., after the initial sequential processing), the codec system may continue with the parallel processing. The codec system may divide the video frame into blocks of a second size, blocks of a third size, and so on. Then, the codec system may process each block in parallel in a manner similar to the initial sequential processing. In some embodiments, instead of using the values of the neighboring block in the parallel processing to calculate the predicted blocks, the values of the neighboring blocks from the generated intermediate blocks are used. This eliminates the dependency between the current block and the previous block, allowing the codec system to process blocks in parallel. For example, the codec system may begin processing blocks of the second size and blocks of the third size at the top of the video frame using a first thread and may simultaneously begin processing blocks of the second size and blocks of the third size at the bottom of the video frame using a second thread.

In some embodiments, one difference between the initial sequential processing and the parallel processing is that for each block in the parallel processing, a prediction size and a prediction mode are selected but an intermediate pixel block is not generated. The generation of the prediction block using the prediction size and the prediction mode selected during the parallel processing is postponed until the final sequential processing.

The final sequential processing may be performed similarly to the initial sequential processing. In some embodiments, instead of partitioning the video frame into blocks of the same size, the video frame is partitioned into blocks based on the selected prediction size for each block. Then, block-by-block, the codec system generates a final predicted block using the selected prediction mode for the block and pixel values from the neighboring, previously-processed final predicted blocks. The cost for each block is not calculated during the final sequential processing. Once the final predicted block is created, the residual is calculated, as described above, and the codec system creates a representation of the video frame (e.g., the image) by encoding the residual, the prediction mode, and the prediction size in the output bitstream.

Figure 3:
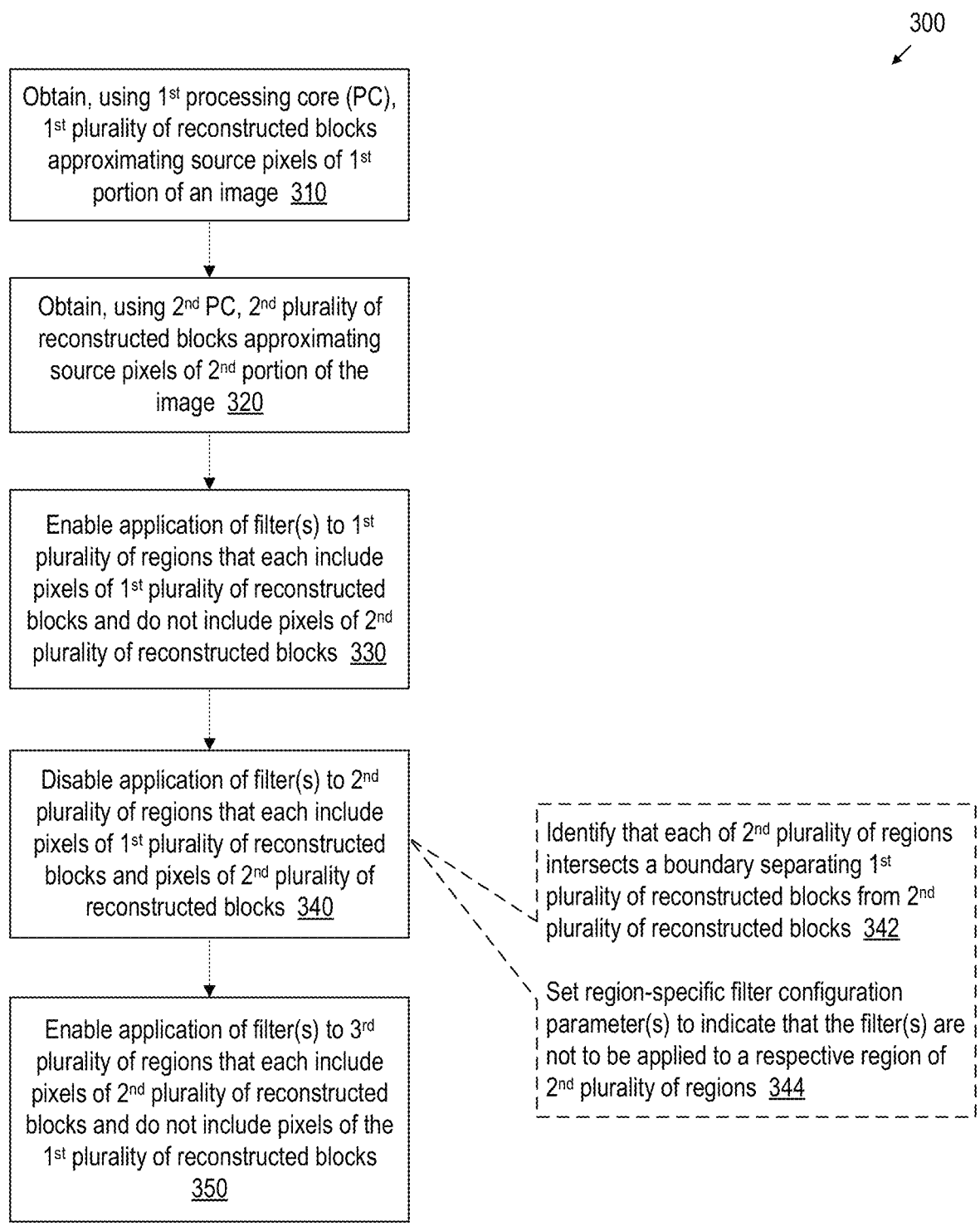
FIG. 3 is a flow diagram of an example method of filtering of reconstructed blocks during multi-core processing of a video frame during video encoding for efficient encoding operations, in accordance with at least some embodiments.

FIG. 3 is a flow diagram of an example method 300 of filtering of reconstructed blocks during multi-core processing of a video frame during video encoding for efficient encoding operations, in accordance with at least some embodiments. In some embodiments, method 300 may be performed by the video encoder 105 of FIG. 1. In some embodiments, method 300 may be performed by a dedicated codec accelerator (e.g., a co-processor) that communicates with one or more memory devices. In some embodiments, method 300 may be performed by a general-purpose processor (e.g., a central processing unit or a graphics processing unit). In some embodiments, at least some operations of method 300 may be performed by multiple (e.g., parallel)

threads, each thread executing one or more individual functions, routines, subroutines, or operations of the method. In some embodiments, processing threads implementing method 300 may be synchronized (e.g., using semaphores, critical sections, and/or other thread synchronization mechanisms). Alternatively, threads implementing method 300 may be executed asynchronously with respect to each other. Various operations of method 300 may be performed in a different order compared with the order shown in FIG. 3. Some operations of method 300 may be performed concurrently with other operations. In some embodiments, one or more operations shown in FIG. 3 are not performed.

The description of method 300 (and methods 400 and 470 below) refers, for brevity and conciseness, to an image. It should be understood that, in some embodiments, an image could be a video frame, such as a frame of a sequence of frames of a motion picture, a video advertisement, a video game, or any other video file (including a synthetic video file) produced by a video camera or any suitable video application. In another embodiment, an image can be an individual image (including a synthetic image), such as a still image, an image produced by a photo camera, a scanner, a graphics application, etc., or any other suitable image that is being compressed.

Method 300 may be performed by a processing logic having multiple (physical or virtual) processing cores. At block 310, method 300 may include obtaining, using a first processing core, a first plurality of reconstructed blocks approximating source pixels of a first portion of the image. In some embodiments, reconstructed blocks may be obtained using operations illustrated in FIG. 2A and FIG. 2B, and described below in conjunction with method 400 of FIG. 4A and method 470 of FIG. 4B. For example, for various locations of the image, block sizes and prediction modes may be selected based on a comparison of computed costs and the obtained predicted pixels may be reconstructed by computing residual blocks, performing discrete transformations, quantization transformations, and so on. Similarly, at block 320, method 300 may continue with obtaining, using a second processing core, a second plurality of reconstructed blocks approximating source pixels of a second portion of the image. For example, referring to FIG. 1B, reconstructed blocks of tile-1 161 and tile-2 162 may be obtained using a first processing core (e.g., core-1 151) while reconstructed blocks of tile-3 163 and tile-4 164 may be obtained using a first processing core (e.g., core-2 152). In some embodiments, the first plurality of reconstructed blocks and the second plurality of reconstructed blocks are obtained using a compression algorithm based on one of AV1, HEVC, VVC, or VP9 video encoding standards, e.g., using block sizes, prediction modes (inter-frame and intra-frame), discrete transformations, quantization transformations, etc. recognized by the respective encoding standard. Operations similar to the operations of blocks 310 and 320 may be performed for any additional core (e.g., a third processing core, a fourth processing core, etc.) that is deployed together with the first processing core and the second processing core.

At blocks 330-350, method 300 may continue with performing filtering of the obtained reconstructed blocks. More specifically, the first processing core may filter the first plurality of reconstructed blocks. The filtering may include, at block 330, enabling application of one or more filters to a first plurality of regions, wherein each of the first plurality of regions includes pixels of the first plurality of reconstructed blocks and does not include pixels of the second plurality of reconstructed blocks. For example, the regions to which filters 153-1, 153-2, and 153-3 are applied in FIG. 1B may belong to the first plurality of regions. Application of the one or more filters to such regions may be enabled. The one or more filters may include at least one of a deblocking filter, a constrained directional enhancement filter, a Wiener filter, or a self-guided filter. At block 340, the first processing core may disable application of the one or more filters to a second plurality of regions, wherein each of the second plurality of regions includes pixels of the first plurality of reconstructed blocks and pixels of the second plurality of reconstructed blocks. For example, the regions to which filters 153-5 and 153-6 are applied in FIG. 1B may belong to the second plurality of regions, containing pixels processed by the first processing core (core-1 151) and pixels processed by the second processing core (core-2 152). Application of the one or more filters to such regions may be disabled. More specifically, in some embodiments, as depicted by the callout portion in FIG. 3, disabling the one or more filters may include identifying, at block 342, that each of the second plurality of regions intersects a boundary separating the first plurality of reconstructed blocks from the second plurality of reconstructed blocks. At block 344, in response to identifying the regions intersecting the boundary, the first processing core may set, for each of the second plurality of regions, one or more region-specific filter configuration parameters to indicate that the one or more filters are not to be applied to a respective region. In some embodiments, the configuration parameters may have a format that is defined in a specification of a video encoder used for compressing the data of the image.

Operations similar to the operations described above in conjunction with blocks 330, 340, 342, and 344 may be performed (e.g., independently and in parallel) by other processing cores. In particular, as depicted with block 350, method 300 may include enabling, using the second processing core, application of the one or more filters to a third plurality of regions, wherein each of the third plurality of regions includes pixels of the second plurality of reconstructed blocks and does not include pixels of the first plurality of reconstructed blocks. For example, the region to which filter 153-4 is applied in FIG. 1B may belong to the third plurality of regions. Application of the one or more filters to such regions may be enabled.

Figure 4A:
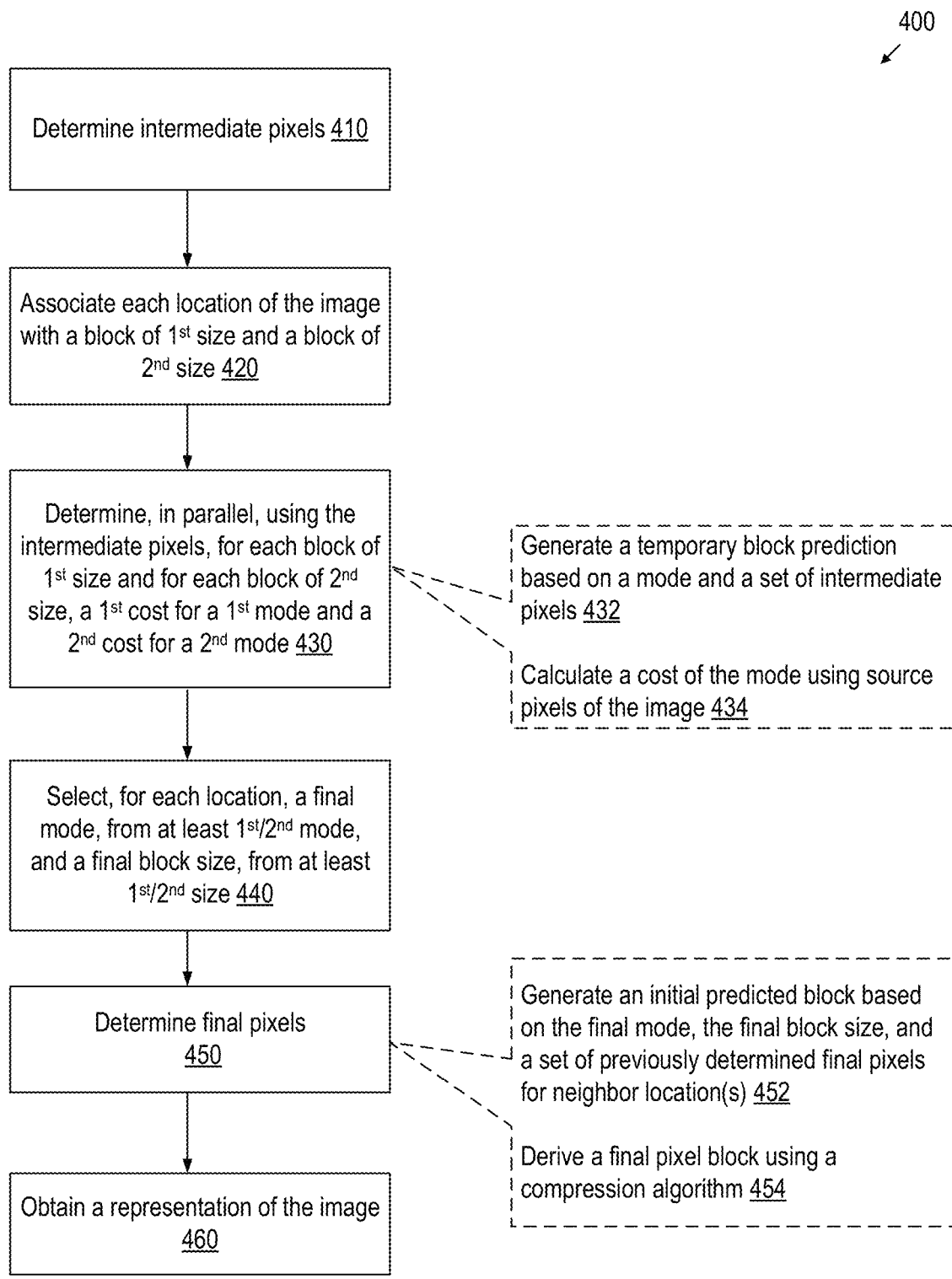
FIG. 4A is a flow diagram of an example method of parallel processing of a video frame during video encoding for efficient encoding operations, in accordance with at least some embodiments.

FIG. 4A is a flow diagram of an example method 400 of parallel processing of a video frame during video encoding for efficient encoding operations, in accordance with at least some embodiments. In some embodiments, method 400 may be performed by the video encoder 105 of FIG. 1. In some embodiments, method 400 may be performed by a dedicated codec accelerator (e.g., a co-processor) that communicates with one or more memory devices. In some embodiments, method 400 may be performed by a general-purpose processor (e.g., a central processing unit or a graphics processing unit). In some embodiments, at least some operations of method 400 may be performed by multiple (e.g., parallel) threads, each thread executing one or more individual functions, routines, subroutines, or operations of the method. In some embodiments, processing threads implementing method 400 may be synchronized (e.g., using semaphores, critical sections, and/or other thread synchronization mechanisms). Alternatively, threads implementing method 400 may be executed asynchronously with respect to each other. Various operations of method 400 may be performed in a different order compared with the order shown in FIG. 4A. Some operations of method 400 may be performed concurrently with other operations. In some embodiments, one or more operations shown in FIG. 4A are not performed.

At block 410, processing logic performing method 400 may determine intermediate pixels (e.g., intermediate pixels 204 of FIG. 2A). In one embodiment, the intermediate pixels may be the result of the initial sequential processing described above in conjunction with FIG. 2A. For example, intermediate pixels may be determined using method 470 illustrated in FIG. 4B below. In another embodiment, the intermediate pixels may be pixels of the source video frame.

At block 420, processing logic (e.g., a first processing core, a second processing core, etc.) may associate each location of the image with a block of a plurality of blocks of a first size and a block a plurality of blocks of a second size. In some embodiments, each location may be further associated with blocks of a third, fourth, etc., size. The first block size and the second block size (as well as blocks of other sizes) may each be a block size defined by a standardized video codec, such as AV1. For example, each superblock of 64×64 pixels may be split into blocks of a first size (32×32 pixels), second size (16×8 pixels), third size (8×8 pixels), fourth size (32×16 pixels), and so on.

At block 430, processing logic may determine, in parallel, using the intermediate pixels, for each block of the first size and for each block of the second size (and blocks of other sizes), a first cost for a first mode and a second cost for a second mode. The processing logic may further determine additional costs for additional modes (e.g., third/fourth/etc., cost for third/fourth/etc. mode), e.g., as illustrated in FIG. 2B in relation to modes 214A-M and costs 220A-M. Block 430 may be performed as part of the parallel processing. In some instances, the first mode and the second mode may be an intra-prediction mode and an inter-prediction mode, respectively, and the cost for each mode may be calculated by the cost function module 110. For example, the first mode may be intra-prediction mode 214A (associated with cost 220A) and the second mode may be inter-prediction mode 280 (associated with cost 292). In another example, the first mode and the second mode may both be intra-prediction modes. In some embodiments, for each block of a given size (first/second/etc.) a respective cost may be determined for all or at least a subset of modes recognized by the codec standard.

In some embodiments, as depicted by the upper callout portion in FIG. 4A, at block 432, for each of the first mode and the second mode of block 430, processing logic may generate a temporary block prediction based on a respective mode and a set of intermediate pixels. As a result, the temporary block predictions may be generated for each block of a given size.

At block 434, for each of the first mode and the second mode of block 430, processing logic may calculate a cost of the respective mode based on a comparison of the temporary block prediction and a corresponding block of source pixels of the image. More specifically, for each block of a given size, multiple temporary block predictions may be obtained, each prediction associated with a respective cost.

At block 440, processing logic may select, for each location of the image, using the first cost and the second cost for each of a respective block of the first size and a respective block of the second size associated with a corresponding location: a final mode, from at least the first mode and the second mode; and a final block size, from at least the first size and the second size. For example, processing logic may determine how each 64×64 pixel superblock is to be partitioned into smaller blocks and what modes are to be used for the representation of source pixels of the respective blocks, e.g., based on the costs calculated for each block/mode combination. For example, a cost of representing the entire top-left square 32×32 pixel block using the inter-prediction mode may be compared to a cost of representing the same square 32×32 pixel block by further splitting it into two rectangular 32×16 pixel blocks with the top rectangular 32×16 pixel block represented using a horizontal intra-prediction mode and the bottom rectangular 32×16 pixel block represented using an oblique angle prediction mode.

At block 450, processing logic may determine final pixels based on the selected final mode and the selected final block size for each location of the image. In some embodiments, as depicted by the lower callout portion in FIG. 4A, at block 452, processing logic may, for each location of the image, generate an initial predicted block based on the selected final mode, the selected final block size, and a set of previously determined final pixels associated with one or more neighbor locations. For example, the initial predicted block may be a winner block selected, based on the cost functions, from temporary block predictions.

At block 454, processing logic may, for each location of the image, derive a final pixel block by transforming the initial predicted block using a compression algorithm. For example, the compression module 111 may determine a residual block for each selected winner block, transform the residual block using one of the discrete transforms recognized by the codec standard (e.g., a discrete Fourier transform), quantize the transformed block, and perform an inverse discrete transform to obtain the final pixel block. Processing logic may further determine parameters of various filters that may be applied to the final pixel block, to improve the visual quality of the block and remove various artifacts of block reconstruction. For example, a deblocking filter may remove visible block boundaries between neighboring blocks, a constrained directional enhancement filter may remove artifacts in the depictions of sharp edges, a loop restoration filter may reduce noise and improve edge quality, and so on.

At block 460, processing logic may obtain, based on the final pixels, a representation of the image. For example, the representation of the image may be the encoded output bitstream of the image that includes identification of the selected block sizes for various portions of the image, selected modes for each block, representations of residual blocks, parameters of filters selected for various blocks, and the like.

Figure 4B:
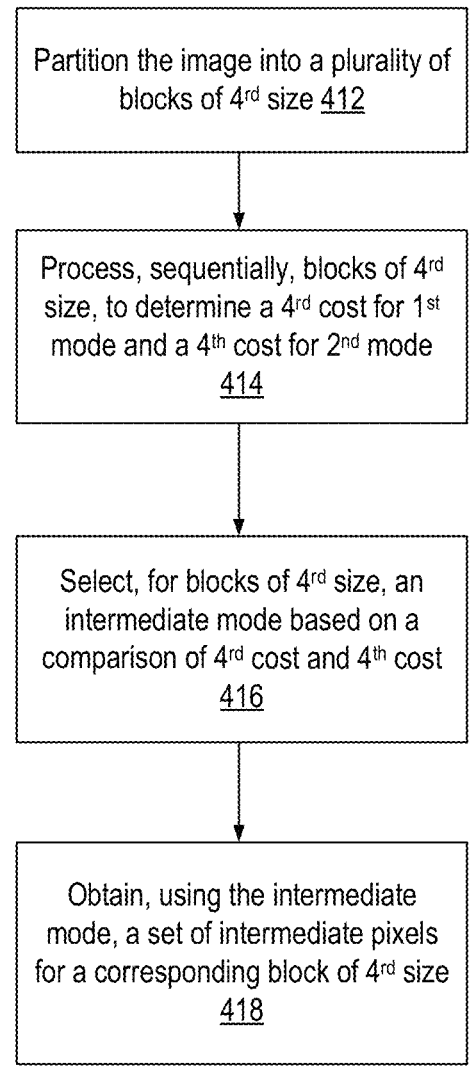
FIG. 4B is a flow diagram of an example method of determining intermediate pixels for use in parallel processing of a video frame during video encoding for efficient encoding operations, in accordance with at least some embodiments.

FIG. 4B is a flow diagram of an example method 470 of determining intermediate pixels for use in parallel processing of a video frame during video encoding for efficient encoding operations, in accordance with at least some embodiments. In an embodiment, the method 470 may be performed as part of block 410. Method 470 may correspond to the initial sequential processing discussed above in conjunction with FIG. 2A and may be performed by the video encoder 105 of FIG. 1.

At block 412, processing logic may partition the image into a plurality of blocks of a pre-determined size, herein referred to as the third size. For example, the image may be partitioned into blocks of size 16×16 pixels, 32×32 pixels, 8×8 pixels or blocks of any other size (including non-square block sizes, e.g., 16×8 pixels).

At block 414, processing logic may process, sequentially, each block of the third size, to determine a third cost for the first mode and a fourth cost for the second mode, wherein determining the third cost and the fourth cost uses a set of intermediate pixels obtained for a previously processed block. In an embodiment, the first mode and the second mode may be an intra-prediction mode and an inter-prediction mode, respectively, and the cost for each mode may be calculated by the cost function module 110. In another embodiment, the first mode and the second mode may both be intra-prediction modes. At block 416, processing logic may select, for each block of the third size, an intermediate mode based on a comparison of the third cost for the first mode and the fourth cost for the second mode. At block 418, processing logic may obtain, using the selected intermediate mode, a set of intermediate pixels for a corresponding block of the third size.

Figure 5:
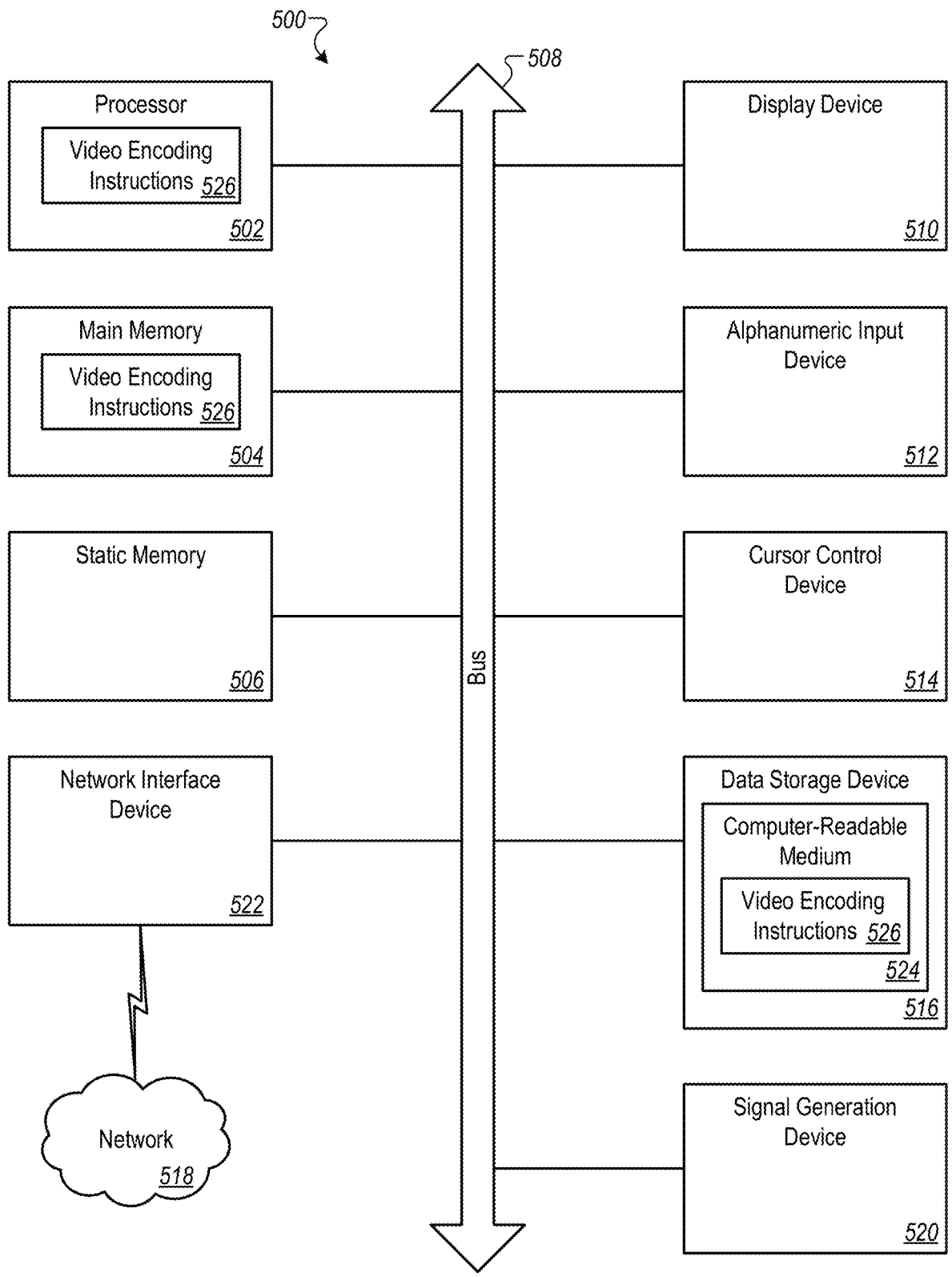
FIG. 5 illustrates an example machine in the form of a computer system within which a set of instructions, for causing the machine to perform any one or more of the methodologies discussed herein, may be executed.

FIG. 5 illustrates an example machine in the form of a computer system 500. The computer system 500 executes one or more sets of instructions 526 that cause the machine to perform any one or more of the methodologies discussed herein. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 526 to perform any one or more of the methodologies discussed herein.

The computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 516, which communicate with each other via a bus 508.

The processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions of the network node for performing the operations and steps discussed herein.

The computer system 500 may further include a network interface device 522 that provides communication with other machines over a network 518, such as a local area network (LAN), an intranet, an extranet, or the Internet. The computer system 500 also may include a display device 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable storage medium 524 on which is stored the sets of instructions 526 of the network node embodying any one or more of the methodologies or functions described herein. The sets of instructions 526 of the network node may also reside, completely or at least partially, within the main memory 504 and/or within the processor 502 during execution thereof by the computer system 500, the main memory 504 and the processor 502 also constituting computer-readable storage media. The sets of instructions 526 may further be transmitted or received over the network 518 via the network interface device 522.

While the example of the computer-readable storage medium 524 is shown as a single medium, the term "computer-readable storage medium" can include a single medium or multiple media (e.g., a centralized or distributed database, and/or associated caches and servers) that store the sets of instructions 526. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

Images and videos generated applying one or more of the techniques disclosed herein may be displayed on a monitor or other display device. In some embodiments, the display device may be coupled directly to the system or processor generating or rendering the images or videos. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images or videos generated by the system or processor may be streamed over the network to the display device. Such streaming allows, for example, video games or other applications, which render images or videos, to be executed on a server or in a data center and the rendered images and videos to be transmitted and displayed on one or more user devices (such as a computer, video game console, smartphone, other mobile devices, etc.) that are physically separate from the server or data center. Hence, the techniques disclosed herein can be applied to enhance the images or videos that are streamed and to enhance services that stream images and videos such as NVIDIA GeForce Now (GFN), Google Stadia, and the like.

Furthermore, images and videos generated applying one or more of the techniques disclosed herein may be used to train, test, or certify deep neural networks (DNNs) used to recognize objects and environments in the real world. Such images and videos may include scenes of roadways, factories, buildings, urban settings, rural settings, humans, animals, and any other physical object or real-world setting. Such images and videos may be used to train, test, or certify DNNs that are employed in machines or robots to manipulate, handle, or modify physical objects in the real world. Furthermore, such images and videos may be used to train, test, or certify DNNs that are employed in autonomous vehicles to navigate and move the vehicles through the real world. Additionally, images and videos generated applying one or more of the techniques disclosed herein may be used to convey information to users of such machines, robots, and vehicles.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium stores instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method for compressing data of an image, the method comprising:
    obtaining, using a first processing core, a first plurality of reconstructed blocks approximating source pixels of a first portion of the image, wherein obtaining the first plurality of reconstructed blocks comprises:
        sequentially processing the source pixels of the first portion of the image to determine intermediate pixels for the first portion of the image, wherein the intermediate pixels are associated with an initial mode and an initial block size;
        associating, with a pixel, a plurality of modes and a plurality of block sizes;
        determining, using the intermediate pixels, a cost for each of the plurality of modes and each of the plurality of block sizes, wherein the costs for at least a subset of the plurality of modes and the plurality of block sizes are determined in parallel;
        selecting, for the pixel, a final mode from the plurality of modes and a final block size of the plurality of block sizes based on the determined costs; and
        using the selected final mode and the final block size to obtain the pixel;
    obtaining, using a second processing core, a second plurality of reconstructed blocks approximating source pixels of a second portion of the image; and
    filtering, using the first processing core, the first plurality of reconstructed blocks, the filtering comprising:
        enabling application of one or more filters to a first plurality of regions, wherein each of the first plurality of regions includes pixels of the first plurality of reconstructed blocks and does not include pixels of the second plurality of reconstructed blocks; and
        disabling application of the one or more filters to a second plurality of regions, wherein each of the second plurality of regions includes pixels of the first plurality of reconstructed blocks and pixels of the second plurality of reconstructed blocks.

2. The method of claim 1, wherein the one or more filters comprise at least one of a deblocking filter, a constrained directional enhancement filter, a Wiener filter, or a self-guided filter.

3. The method of claim 1, wherein the first plurality of reconstructed blocks and the second plurality of reconstructed blocks are obtained using a compression algorithm based on one of AV1, HEVC, VVC, or VP9 video encoding standards.

4. The method of claim 1, further comprising:
    enabling, using the second processing core, application of the one or more filters to a third plurality of regions, wherein each of the third plurality of regions includes pixels of the second plurality of reconstructed blocks and does not include pixels of the first plurality of reconstructed blocks.

5. The method of claim 1, wherein disabling application of the one or more filters to the second plurality of regions comprises:
    identifying that each of the second plurality of regions intersects a boundary separating the first plurality of reconstructed blocks from the second plurality of reconstructed blocks; and
    setting, for each of the second plurality of regions, one or more region-specific filter configuration parameters to indicate that the one or more filters are not to be applied to a respective region of the second plurality of regions, wherein the one or more region-specific filter configuration parameters have a format defined in a specification of a video encoder used for compressing the data of the image.

6. The method of claim 1, wherein obtaining the first plurality of reconstructed blocks further comprises:
    associating, using the first processing core, the pixel with a first block size of the plurality of block sizes and a second block size of the plurality of block sizes;

determining, using the first processing core, in parallel, using the intermediate pixels, for each of the first block size and the second block size, a first cost for a first mode of the plurality of modes and a second cost for a second mode of the plurality of modes;

selecting, using the first processing core, the pixel, i) a final mode from at least the first mode or the second mode and ii) a final block size from at least the first block size or the second block size, using the first cost and the second cost; and determining, using the first processing core, the pixel based on the selected final mode and the selected final block size.

7. The method of claim 6, wherein determining the intermediate pixels comprises:

partitioning, using the first processing core, the first portion of the image into a plurality of blocks of a third block size;

processing, sequentially, each block of the third block size, to determine a third cost for the first mode and a fourth cost for the second mode, wherein determining the third cost and the fourth cost uses a set of intermediate pixels obtained for a previously processed block;

selecting, for each block of the third block size, an intermediate mode based on a comparison of the third cost for the first mode and the fourth cost for the second mode; and obtaining, using the selected intermediate mode, a set of intermediate pixels for a corresponding block of the third size.

8. A system comprising:

a memory device to store source pixels of an image; and one or more circuits communicatively coupled to the memory device, the one or more circuits configured to:

obtain, using a first processing core, a first plurality of reconstructed blocks approximating the source pixels of a first portion of the image, wherein to obtain the first plurality of reconstructed blocks the one or more circuits are configured to:

sequentially process the source pixels of the first portion of the image to determine intermediate pixels for the image, wherein the intermediate pixels are associated with an initial mode and an initial block size;

associate, with a pixel, a plurality of modes and a plurality of block sizes;

determine, using the intermediate pixels, a cost for each of the plurality of modes and each of the plurality of block sizes, wherein the costs for at least a subset of the plurality of modes and the plurality of block sizes are determined in parallel;

select, for the pixel, a final mode from the plurality of modes and a final block size of the plurality of block sizes based on the determined costs; and use the selected final mode and the final block size to obtain the pixel;

obtain, using a second processing core, a second plurality of reconstructed blocks approximating the source pixels of a second portion of the image; and filter, using the first processing core, the first plurality of reconstructed blocks, wherein to filter the first plurality of reconstructed blocks, the one or more circuits are to:

enable application of one or more filters to a first plurality of regions, each of the first plurality of regions comprising pixels of the first plurality of reconstructed blocks and excluding pixels of the second plurality of reconstructed blocks; and disable application of the one or more filters to a second plurality of regions, each of the second plurality of regions comprising pixels of the first plurality of reconstructed blocks and pixels of the second plurality of reconstructed blocks.

9. The system of claim 8, wherein the one or more filters comprise at least one of a deblocking filter, a constrained directional enhancement filter, a Wiener filter, or a self-guided filter.

10. The system of claim 8, wherein the first plurality of reconstructed blocks and the second plurality of reconstructed blocks are obtained using a compression algorithm based on one of AV1, HEVC, VVC, or VP9 video encoding standards.

11. The system of claim 8, wherein the one or more circuits are further configured to:

enable, using the second processing core, application of the one or more filters to a third plurality of regions, wherein each of the third plurality of regions includes pixels of the second plurality of reconstructed blocks and does not include pixels of the first plurality of reconstructed blocks.

12. The system of claim 8, wherein to disable application of the one or more filters to the second plurality of regions, the one or more circuits are further configured to:

identify that each of the second plurality of regions intersects a boundary separating the first plurality of reconstructed blocks from the second plurality of reconstructed blocks; and set, for each of the second plurality of regions, one or more region-specific filter configuration parameters to indicate that the one or more filters are not to be applied to a respective region of the second plurality of regions, wherein the one or more region-specific filter configuration parameters have a format defined in a specification of a video encoder used for compressing the image.

13. The system of claim 8, wherein to obtain the first plurality of reconstructed blocks, the one or more circuits are further configured to:

associate, using the first processing core, the pixel with a first block of a plurality of block sizes and a second block size of the plurality of block sizes;

determine, using the first processing core, in parallel, using the intermediate pixels, for each of the first block size and the second block size, a first cost for a first mode of the plurality of modes and a second cost for a second mode of the plurality of modes;

select, using the first processing core, i) a final mode from at least the first mode or the second mode and ii) a final block size from at least the first block size or the second block size, using the first cost and the second cost; and determine, using the first processing core, the pixel based on the selected final mode and the selected final block size.

14. The system of claim 13, wherein to determine the intermediate pixels, the one or more circuits are configured to:

partition, using the first processing core, the first portion of the image into a plurality of blocks of a third block size;

process sequentially, each block of the third block size, to determine a third cost for the first mode and a fourth cost for the second mode, wherein determining the third cost and the fourth cost uses a set of intermediate pixels obtained for a previously processed block;

selecting, for each block of the third block size, an intermediate mode based on a comparison of the third cost for the first mode and the fourth cost for the second mode; and obtaining, using the selected intermediate mode, a set of intermediate pixels for a corresponding block of the third size.

15. A non-transitory computer-readable medium comprising instructions, which when executed by a processor cause the processor to perform operations comprising:

obtaining, using a first processing core of the processor, a first plurality of reconstructed blocks approximating source pixels of a first portion of an image, wherein obtaining the first plurality of reconstructed blocks is obtained comprises:

sequentially processing the source pixels of the first portion of the image to determine intermediate pixels for the image, wherein the intermediate pixels are associated with an initial mode and an initial block size;

associating, with a pixel, a plurality of modes and a plurality of block sizes;

determining, using the intermediate pixels, a cost for each of the plurality of modes and each of the plurality of block sizes, wherein the costs for at least a subset of the plurality of modes and the plurality of block sizes are determined in parallel;

selecting, for the pixel, a final mode from the plurality of modes and a final block size of the plurality of block sizes based on the determined costs; and using the selected final mode and the final block size to obtain the pixel;

obtaining, using a second processing core of the processor, a second plurality of reconstructed blocks approximating source pixels of a second portion of the image; and filtering, using the first processing core, the first plurality of reconstructed blocks, the filtering comprising:

enabling application of one or more filters to a first plurality of regions, wherein each of the first plurality of regions includes pixels of the first plurality of reconstructed blocks and does not include pixels of the second plurality of reconstructed blocks; and disabling application of the one or more filters to a second plurality of regions, wherein each of the second plurality of regions includes pixels of the first plurality of reconstructed blocks and pixels of the second plurality of reconstructed blocks.

16. The non-transitory computer-readable medium of claim 15, wherein the one or more filters comprise at least one of a deblocking filter, a constrained directional enhancement filter, a Wiener filter, or a self-guided filter.

17. The non-transitory computer-readable medium of claim 15, wherein the first plurality of reconstructed blocks and the second plurality of reconstructed blocks are obtained using a compression algorithm based on one of AV1, HEVC, VVC, or VP9 video encoding standards.

18. The non-transitory computer-readable medium of claim 15, wherein the instructions further cause the processor to perform operations comprising:

enabling, using the second processing core, application of the one or more filters to a third plurality of regions, wherein each of the third plurality of regions includes pixels of the second plurality of reconstructed blocks and does not include pixels of the first plurality of reconstructed blocks.

19. The non-transitory computer-readable medium of claim 15, wherein disabling application of the one or more filters to the second plurality of regions comprises:

identifying that each of the second plurality of regions intersects a boundary separating the first plurality of reconstructed blocks from the second plurality of reconstructed blocks; and setting, for each of the second plurality of regions, one or more region-specific filter configuration parameters to indicate that the one or more filters are not to be applied to a respective region of the second plurality of regions, wherein the configuration parameters have a format defined in a specification of a video encoder used for compressing the image.

20. The non-transitory computer-readable medium of claim 15, wherein obtaining the first plurality of reconstructed blocks comprises:

associating, using the first processing core, the pixel with a first block size of a plurality of block sizes and a second block size of the plurality of block sizes;

determining, using the first processing core, in parallel, using the intermediate pixels, for each of the first block size and the second block size, a first cost for a first mode of the plurality of modes and a second cost for a second mode of the plurality of modes;

selecting, using the first processing core, for each location of the first portion of the image, i) a final mode from at least the first mode and the second mode and ii) a final block size from at least the first size and the second size, using the first cost and the second cost for each of a respective block of the first size and a respective block of the second size associated with a corresponding location; and determining, using the first processing core, the pixel based on the selected final mode and the selected final block size.

* * * * *